United States Patent [19]

Jackson

[11] 4,431,099
[45] Feb. 14, 1984

[54] CENTRIFUGAL CLUTCH MECHANISM

[76] Inventor: Paul C. Jackson, 2832 E. 1st Pl., Tulsa, Okla. 74104

[21] Appl. No.: 241,500

[22] Filed: Mar. 9, 1981

[51] Int. Cl.³ .................... F16D 13/42; F16D 43/04
[52] U.S. Cl. ........................... 192/105 C; 192/99 A
[58] Field of Search .......... 192/105 C, 103 A, 99 A, 192/70.23, 70.24; 474/158

[56] References Cited

U.S. PATENT DOCUMENTS

| | | | |
|---|---|---|---|
| 212,337 | 2/1879 | Weston | 192/105 C |
| 505,617 | 9/1893 | Twitt | 192/99 A X |
| 675,388 | 6/1901 | Keating | 474/158 X |
| 715,418 | 12/1902 | Parsons | 192/105 C X |
| 834,857 | 10/1906 | Worrall | 192/99 A X |
| 1,058,594 | 4/1913 | Karshner | 192/105 C X |
| 1,508,464 | 9/1924 | McFarland | 192/105 C X |
| 1,793,735 | 2/1931 | De La Mater | 192/105 C |
| 1,969,990 | 8/1934 | Putney | 192/105 C |
| 2,045,131 | 6/1936 | Giordano | 192/105 C |
| 2,512,816 | 6/1950 | Sweger | 192/105 C X |
| 2,657,781 | 11/1953 | Zeidler | 192/99 |
| 2,659,220 | 11/1953 | Cherry | 474/158 X |
| 2,802,370 | 8/1957 | Benzin | 192/105 C X |
| 2,885,047 | 5/1959 | Kehrl . | |
| 3,337,016 | 8/1967 | Maucher . | |
| 3,455,422 | 7/1969 | Spar et al. | 192/105 |
| 3,769,905 | 11/1973 | Dishcler | 192/105 C X |
| 3,770,088 | 11/1973 | Shono | 192/70.27 |

Primary Examiner—Rodney H. Bonck
Attorney, Agent, or Firm—Head, Johnson & Stevenson

[57] ABSTRACT

A centrifugal clutch mechanism comprising a central hub secured to the outer periphery of an axle for simultaneous rotation therebetween, a clutch plate secured to the hub member for rotation therewith, an annular plate journalled around the outer periphery of the hub member for independent rotation with respect thereto and operably connected with a power source for rotation thereby, annular friction disc members disposed on the opposite sides of the clutch plate, a plurality of circumferentially spaced segments secured to the annular plate and disposed outboard of the clutch plate, the segments being movable in directions toward and away from the clutch plate for selective rotation of the clutch plate with the annular plate, pivotal link members provided at the inner end of each segment, the link members having a normal radially inwardly directed position with respect to the axle and being responsive to centrifugal force for moving radially outwardly for urging the segments into a driving engagement with respect to the clutch plate for rotation of the clutch plate.

4 Claims, 3 Drawing Figures

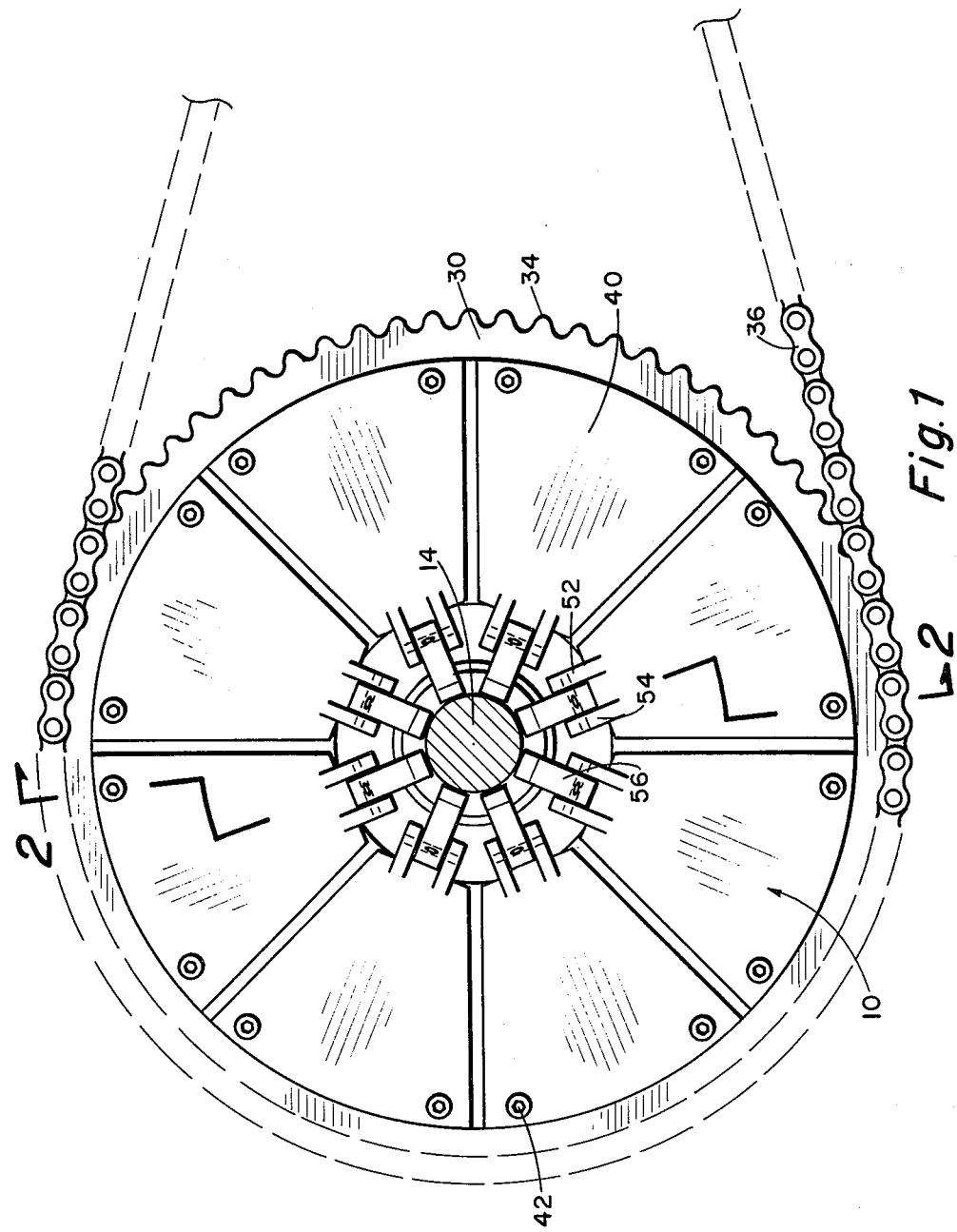

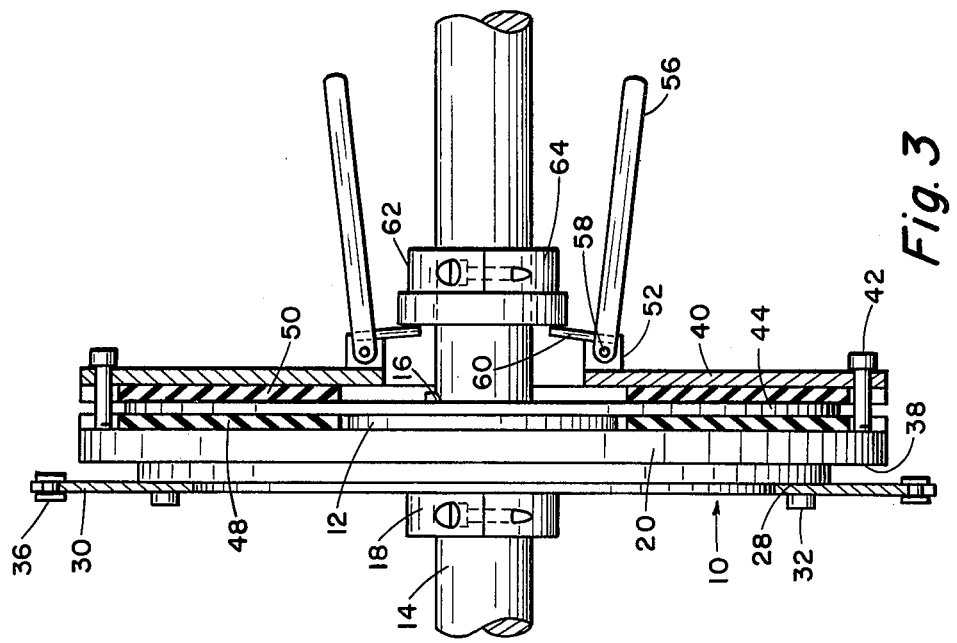
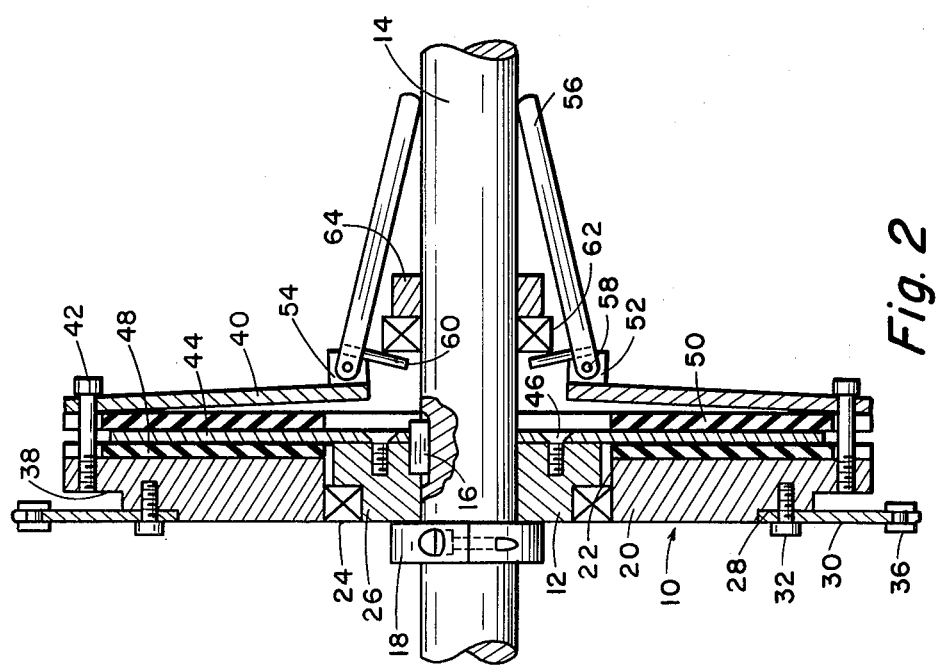

CENTRIFUGAL CLUTCH MECHANISM

BACKGROUND OF THE INVENTION

1. Field of the Invention

This invention relates to improvements in clutch devices and more particularly, but not by way of limitation, to a centrifugal clutch mechanism.

2. Description of the Prior Art

In relatively small powered vehicles, such as go-carts and the like, it is desirable to provide a rapid and efficient clutch action while maintaining the weight of the clutching apparatus at a minimum. In addition, it is desirable to eliminate the necessity of clutch actuation through the use of the hands or feet of the operator of the vehicle. Centrifugal friction type clutches are in use today for transmitting rotation between a driver, such as an engine, and a driven member, such as a transmission, or the like. Clutches of these type are shown in the Zeidler U.S. Pat. No. 2,657,781, issued Nov. 3, 1953; the Keyrl U.S. Pat. No. 2,885,047, issued May 5, 1959; the Maucher U.S. Pat. No. 3,337,016, issued Aug. 22, 1967; the Spar et al U.S. Pat. No. 3,455,422, issued July 15, 1969; and the Shono U.S. Pat. No. 3,770,088, issued Nov. 6, 1973. These clutches have certain disadvantages, however, in that each is adapted for operable connection with the flywheel of the engine. The usual go-cart engine is a motorcycle-type engine which normally does not include a flywheel, but rather incorporates a chain drive system. As a result, the presently available centrifugal friction clutches cannot be readily utilized in combination with the go-cart or motorcycle engine, and at best have operational and weight disadvantages.

SUMMARY OF THE INVENTION

The present invention contemplates a centrifugal friction clutch for go-carts, and the like, and particularly designed for overcoming the foregoing disadvantages. The novel clutch comprises a hub member keyed to the outer periphery of an axle member for simultaneous rotation therebetween. An annular space plate is suitably journalled around the outer periphery of the hub for independent rotation with respect thereto, and a gear member is secured to the plate for movement simultaneously therewith. The gear is adapted for engagement with the normal chain drive of the go-cart or motorcycle engine for continual rotation of the plate during actuation of the chain drive mechanism. A clutch plate is secured to the hub member for simultaneous rotation therebetween and is spaced from the annular plate member. A plurality of substantially pie-shaped segments are secured to the plate member and spaced outboard of the clutch plate, and suitable friction pads, or the like, are disposed on the opposite faces of the clutch plate for cooperating with the segments and the annular plate to selectively transmit rotation to the clutch plate. A pivotal link member is secured to the inner end of each segment, said link members having a normal "at rest" position extending radially inwardly toward the outer periphery of the axle. The link members are responsive to centrifugal force for moving radially outwardly for moving the segments into a driving engagement with the outboard friction pads, and the link members are provided with means for holding the segments in a tight driving engagement with the friction pads continually during rotation of the annular plate member at a sufficient speed for creating the required centrifugal force acting on the link members. In operation, the annular plate member is rotated immediately upon actuation of the chain drive mechanism of the engine, and the segment members carried by the plate are rotated simultaneously therewith for transmitting sufficient centrifugal force to each link member whereby the link members move rapidly outwardly from the outer periphery of the axle. This movement of the link members causes each segment to be forced into a driving engagement with the outboard friction pad means, thus "squeezing" the clutch plate between the friction pads whereby the clutch plate rotates simultaneously with the annular plate. As the clutch plate rotates, the rotation is transmitted to the axle through the hub member keyed thereto. Thus, the axle begins to rotate about its longitudinal axis substantially instantaneously with the actuation of the chain drive of the engine. The novel clutch mechanism functions rapidly and efficiently, and is of a lightweight construction for reducing hindrance in the overall operating efficiency of the go-cart or the like. The novel clutch mechanism is simple and efficient in operation and economical and durable in construction.

BRIEF DESCRIPTION OF THE DRAWINGS

FIG. 1 is a side elevational view of a clutch embodying the invention, with a portion of a chain drive shown for purposes of illustration.

FIG. 2 is a view taken along line 2—2 of FIG. 1; and

FIG. 3 is a view similar to FIG. 2 illustrating a driving or engaged position for a clutch embodying the invention.

DETAILED DESCRIPTION OF THE PREFERRED EMBODIMENTS

Referring to the drawings in detail, reference character 10 generally indicates a centrifugal friction clutch assembly comprising a central hub member 12 secured to the outer periphery of an axle 14, or the like, in any suitable manner, such as by a key 16, for rotation about the longitudinal axis of the axle 14 simultaneously therewith. A collar member 18 is clamped or otherwise secured around the outer periphery of the axle 14 in the proximity of one end of the hub member 12 for precluding longitudinal movement of the hub 12 along the outer periphery of the axle 14 in one direction. An annular drive plate member 20 having a central bore 22 of a diameter greater than the outer diameter of the hub 12 is disposed around the outer periphery of the hub and is rotatably supported by a suitable bearing 24. The bearing 24 is disposed around the outer periphery of a reduced stem member 26 of the hub member 12 and is disposed against an outwardly extending circumferential shoulder 28 provided on the hub 12 as particularly shown in FIGS. 2 and 3. In this manner, the annular plate 20 is freely rotatable about the longitudinal axis of the axle 14 independently of the hub member 12 and axle 14.

The annular plate 20 is provided with a first annular recess 28 on the outboard face thereof for receiving an annular gear member 30 therein. The gear member 30 may be secured to the plate 20 in any suitable manner, such as by a plurality of circumferentially spaced bolts 32, whereby the plate 20 and gear 30 may rotate about the longitudinal axis of the shaft or axle 14 as a unit. The outer periphery of the gear 30 is provided with suitable circumferentially spaced teeth 34, as is well known, for a driving or meshing engagement with the usual chain drive member 36 of a suitable engine (not shown) for a purpose as will be hereinafter set forth.

The plate 20 is provided with a second annular recess 38 conterminous with the recess 28 and extend inboard therefrom to provide a hiatus between the gear 30 and the outer circumferential portion of the plate 20. A plurality of substantially pie-shaped circumferentially spaced segments 40 having the outer peripheral portion secured to the plate 20 in any suitable manner, such as by a plurality of spaced bolts 42, and the inner ends free of or independent of the drive plate 20. The hiatus between the plate 20 and gear 30 permits the use of suitable lock nuts (not shown) if desired for securely retaining the bolts 40 in position. The segments 40 are disposed in spaced relation with respect to the inboard face of the plate 20 for a purpose as will be hereinafter set forth.

An annular clutch plate 44 is secured to the inboard end of the hub 12 in any suitable manner, such as by a plurality of spaced screws 46, and is rotatable about the axis of the axle 14 simultaneously with the hub member 12. A first friction pad means 48 is interposed between the clutch plate 44 and the inboard face of the annular plate 20. A second friction pad means 50 is similarly interposed between the outboard face of the clutch plate 44 and the segments 40. The friction pad means 48 and 50 may be constructed from any suitable material, such as rubber, brake lining material, or the like, and may be of any suitable configuration, such as annular members, a plurality of spaced friction pads, or the like, as desired.

The inner end of each segment 40 is provided with a pair of spaced outwardly extending flanges 52 and 54 having a link member 56 pivotally secured therebetween in any suitable manner, such as by a pivot pin 58. Each link member 56 is provided with a finger member 60 extending substantially perpendicularly outwardly therefrom in a direction toward the axle 14, as particularly shown in FIGS. 2 and 3. The outer end of each finger 60 is constantly in engagement with a suitable bearing means 62 which is disposed around the outer periphery of the axle 14 in spaced relation with respect to the clutch plate 44. A suitable collar member 64 similar to the collar member 18 is secured around the outer periphery of the axle 14 outboard of the bearing 62 for precluding axial movement of the bearing in a direction away from the hub 12.

In operation, the gear 30 rotates continually during actuation of the chain 36 in the usual manner by the chain drive system (not shown) of the engine (not shown). The rotation of the gear 30 is transmitted to the drive plate 20 through the connection therebetween, and the drive plate 20 is free to rotate about the outer periphery of the hub 12. The segments 40 are secured to the plate 20 by the bolts 42, and thus the segments rotate simultaneously with the plate 20. When the speed of rotation of the annular plate 20 becomes sufficiently great, the centrifugal force acting on the link members 56 causes the link members to move from the normal resting or inwardly directed position thereof shown in FIG. 2 to the angularly outwardly extending position thereof shown in FIG. 3.

As the link members 56 move outwardly, the finger members 60 are moved in a wedging engagement with the bearing 62, which limits any further outward movement of the link members, and forces the inner ends of the segments 40 in a direction toward the clutch plate 50. This creates an axial pressure between the segments and annular plate 20 for "squeezing" the clutch plate 44 between the friction pad means 48 and 50. The friction engagement with the clutch plate 44 causes the clutch plate to rotate simultaneously with the annular plate 20 and segments 40. The rotation of the clutch plate 44 is transmitted to the hub 12 through the connection therebetween, and the hub 12 transmits rotation to the axle 14.

Of course, the actuation of the assembly 10 is reversed when it is desirable to stop the rotation of the axle 14. In this instance, the speed of rotation of the annular plate 20 is reduced, whereby the centrifugal force acting on the link members 56 is reduced, and the link members 56 fall freely into the normal resting position therefor. The link members 56 may be returned to the normal resting position thereof by gravity, or it may be desirable to provide suitable spring means (not shown) for providing a positive return action for the link members 56. The spring means (not shown) may be of any suitable type, such as a helical spring disposed around the pivot pin 58 of each link member 56, each helical spring being unwound upon the outward movement of the link members 56, and recoiling or rewinding upon the relief of the centrifugal force acting on the link member 56.

From the foregoing it will be apparent that the present invention provides a novel centrifugal friction clutch particularly designed and for use in connection with go-carts, and the like, and comprising a drive plate operably connected with the chain drive of the vehicle engine for rotation thereby. A plurality of flexing segments are secured to the drive plate for rotation simultaneously therewith, and a clutch plate is interposed between the drive plate and segments and independently rotatable with respect thereto. Link means are carried by each segment and responsive to centrifugal force for selectively urging the segments in a direction toward the drive plate for squeezing the clutch plate between friction pad means, whereby the clutch plate rotates simultaneously with the drive plate. The clutch plate is operably connected with the drive shaft or axle of the vehicle through a hub member, and rotation of the clutch plate is thus transmitted to the axle. When the drive plate is rotated at a speed for generating sufficient centrifugal force acting on the link members, the clutch plate will be rotated, and when the speed of rotation of the drive plate is reduced, the clutch plate will be released from the frictional engagement for ceasing the rotation of the axle.

Whereas the present invention has been described in particular relation to the drawings attached hereto, it should be understood that other and further modifications, apart from those shown or suggested herein, may be made within the spirit and scope of this invention.

What is claimed is:

1. A light weight centrifugal friction clutch assembly operable in the absence of a flywheel and interposed between a vehicle chain drive and a rotatable shaft, the clutch assembly comprising hub means disposed around the outer periphery of the shaft and secured thereto for simultaneous rotation therebetween, bearing means disposed around the hub means, drive plate means disposed around the outer periphery of the hub means and bearing means to provide independent rotation of the drive plate means with respect to the hub means, clutch plate means secured to the hub means for rotation simultaneously therewith and axially spaced from the drive plate means, a plurality of circumferentially spaced segments secured to the drive plate means for rotation simultaneously therewith and spaced axially outboard of the clutch plate means, link means secured to each segment and responsive to centrifugal force for movement between a resting position and a driving position for moving the segments into a driving engagement with the drive plate means in the driving position of the link means, friction means interposed between the clutch plate means and drive plate means for frictional engagement with the clutch plate means in the driving engagement between the segments and drive plate means for transmitting rotation to the shaft, and wherein the link means comprises an independent link member pivotally secured to the inner end of each segment and movable between radially inward and radially outward positions in response to centrifugal force acting thereon, and means carried by each link member for securely urging the respective segment into said driving engagement with the clutch plate means in the radially outward position of the respective link member.

2. A light weight centrifugal friction clutch assembly as set forth in claim 1 wherein the segments are of a substantially pie-shaped configuration having the outer periphery thereof secured to the drive plate means and the inner periphery portion free with respect thereto, said free inner periphery movable in the directions toward and away from the drive plate in response to the movement of the link means for providing alternate driving engagement and release of the clutch plate means.

3. A light weight centrifugal friction clutch assembly as set forth in claim 1 and including bearing means disposed around the outer periphery of the shaft and disposed inboard of the segments, and wherein the means carried by each link member comprises a finger member provided on the inner end of each link member and extending outwardly therefrom in a direction toward the bearing means and in constant engagement therewith.

4. A light weight centrifugal friction clutch assembly as set forth in claim 3 and including first collar means secured around the outer periphery of the shaft and disposed adjacent the outer end of the hub means for precluding axial movement of the hub means in one direction, and second collar means disposed around the outer periphery of the shaft and disposed adjacent the outer end of the bearing means for precluding axial movement of the bearing means in an opposite direction.

* * * * *